United States Patent [19]

de Jong et al.

[11] Patent Number: 5,459,230
[45] Date of Patent: Oct. 17, 1995

[54] COPOLYAMIDE MELT ADHESIVES FOR HEAT SEALING TEXTILES

[75] Inventors: Eduard de Jong, Troisdorf; Karl-Heinz Hapelt, Bonn, both of Germany

[73] Assignee: Elf Autochem Deutschland GmbH, Dusseldorf, Germany

[21] Appl. No.: 250,024

[22] Filed: May 27, 1994

[30] Foreign Application Priority Data

May 29, 1993 [DE] Germany ............ 43 18 047.7

[51] Int. Cl.⁶ .................................. C08G 73/10
[52] U.S. Cl. .................. 528/310; 528/315; 528/322; 528/323; 528/324; 528/332; 528/600; 528/606; 525/425; 525/432; 525/436; 526/935
[58] Field of Search ................ 528/310, 315, 528/322, 323, 324, 332; 525/432, 436, 425; 526/935; 524/600, 606

[56] References Cited

U.S. PATENT DOCUMENTS

| | | | |
|---|---|---|---|
| 4,030,957 | 6/1977 | Raabe et al. | 156/331 |
| 4,093,492 | 6/1978 | Raabe et al. | 156/331 |
| 4,459,389 | 7/1984 | Mumcu et al. | 525/425 |
| 4,483,975 | 11/1984 | de Jong et al. | 528/288 |
| 4,487,895 | 12/1984 | Feldmann et al. | 525/432 |

*Primary Examiner*—P. Hampton-Hightower
*Attorney, Agent, or Firm*—Schweitzer Cornman & Gross

[57] ABSTRACT

The use of copolyamides as melt adhesive for heat sealing is disclosed. At least three monomer components are copolymerized in the copolyamide. These monomer components are selected from the following group: an equimolar mixture of adipic acid and hexamethylenediamine (6,6 salt), lauric acid lactam, 11-aminoundecanoic acid, an equimolar mixture of azelaic acid and hexamethylenediamine (6,9 salt), an equimolar mixture of sebacic acid and hexamethylenediamine (6,10 salt) and an equimolar mixture of dodecane dicarboxylic acid and hexamethylenediamine (6,12 salt), the melting point of the copolyamide being lower than 140° C. and at least 10% by weight of lauric acid lactam and/or 11-aminoundecanoic acid being copolymerized.

8 Claims, No Drawings

COPOLYAMIDE MELT ADHESIVES FOR HEAT SEALING TEXTILES

FIELD OF INVENTION

The invention relates to the use of copolyamides as melt adhesives for heat sealing particularly textiles, at least 3 monomer components being copolymerized in the copolyamide, the monomer components being selected from the group comprising an equimolar mixture of adipic acid and hexamethylenediamine (6,6 salt), lauric acid lactam, 11-aminoundecanoic acid, an equimolar mixture of azelaic acid and hexamethylenediamine (6,9 salt), an equimolar mixture of sebacic acid and hexamethylenediamine (6,10 salt) and an equimolar mixture of dodecane dicarboxylic acid and hexamethylenediamine (6,12 salt), the melting point of the copolyamide being lower than 140° C. and at least 10% by weight of lauric acid lactam and/or 11-aminoundecanoic acid being copolymerized.

Melt adhesives, based on aliphatic copolyamides, for producing washfast, dry cleaning-resistant bonding between interlinings and upper cloth (so-called front fixing), have been known for a long time and are used on a large scale worldwide. Such polyamides are disclosed, for example, in the German Offenlegungsschrift 15 94 233. The melt temperature of 80° to 130° C., desired for bonding the textiles, is brought about by combining ω-amino acids, such as 11-11-aminoundecanoic acid and further polyamide-forming compounds, such as the 6,6 salt, the 6,9 salt, the 6,10 salt and/or the 6,12 salt in different amounts with the components conventionally used, namely caprolactam/ω-aminocaproic acid and lauric acid lactam/ω-aminolauric acid.

The German Offenlegungsschrift 23 24 160 discloses, for example, a copolyamide, in which 20–40% by weight of caprolactam, 20–35% by weight lauric acid lactam, 15–35% by weight of 11-aminoundecanoic acid and 15–40% by weight of an equimolar mixture of hexamethylenediamine and a dicarboxylic acid with 6, 9, 10, 11 or 12 carbon atoms are copolymerized.

The German Offenlegungsschrift 19 39 758 discloses polyamides, which have a high water absorption and, at the same time, are resistant to hot water. These polyamides necessarily contain certain proportions of branched diamines.

Aside from these known polyamides, all of which must contain lauric acid lactam as a monomer component, copolyamides without lauric acid lactam, which can be used as textile melt adhesives, have also become known. For example, in the German patents 26 15 765 and 24 18 988, copolyamides are disclosed, which contain dimer fatty acid instead of lauric acid lactam.

In the melted state, the known polyamides have a sufficiently high adhesiveness, so that they can be used in the textile industry for heat sealing and for gluing fabrics. They also have a good resistance to the solvents used for dry cleaning textiles and to the laundering temperatures of up to about 80° C. customarily used in the textile industry. However, this resistance depends largely on a high content of lauric acid lactam and/or 11-aminoundecanoic acid or dimer fatty acid. Admittedly, as the content of these basic components increases, the resistance to laundering at higher laundering temperatures also increases. However, at the same time, there is an undesirable increase in the melting temperature of the copolyamides. The known copolyamides can therefore not be used for the heat-sealing of temperature-sensitive substrates such as leather, temperature-sensitive natural and/or synthetic nonwovens, felts, fleeces and the like. As a solution for this problem, a copolyamide containing a large proportion of caprolactam and having a melting temperature lower than 115° C. was proposed in the German Offenlegungsschrift 23 24 160. This copolyamide must contain 20–40% by weight of caprolactam. This copolyamide is suitable for heat sealing temperature-sensitive substrates and, despite low adhesion temperatures, has a high adhesiveness and a high resistance to dry-cleaning agents.

However, the copolyamides, which are synthesized using caprolactam, contain 8–10% by weight of the caprolactam used for the polymerization in the monomeric form. This means that, when bonding at elevated temperatures, caprolactam evaporates and gets into the room air which, from environmental and disposal points of view, represents a serious disadvantage of the known copolyamide melt adhesives.

If such known caprolactam-containing polyamides are used, for example, in the automobile industry for gluing textile linings of, for example, doors, roofs and parcel shelves in motor vehicles, so-called "fogging" always occurs, that is, deposits of caprolactam are formed after some time on the windows of the motor vehicle.

Accordingly, the content of monomeric caprolactam is a serious disadvantage of the known copolyamides. Up till now, however, caprolactam was regarded as an indispensable component for adjusting low melting temperatures, which are necessary for bonding sensitive substrates.

OBJECT OF THE INVENTION

It is therefore an object of the present invention to make copolyamides available, which are suitable for bonding sensitive textiles at low temperatures, yet contain no caprolactam. The copolyamide shall furthermore have a high adhesiveness and a good resistance to hot water and dry cleaning.

SUMMARY OF THE INVENTION

Surprisingly, it has now been found that this objective can be accomplished by using copolyamides as melt adhesives for heat sealing, the copolyamide being characterized in that A) at least three of the following monomer components are copolymerized with it:
  a) an equimolar mixture of adipic acid and hexamethylenediamine (6,6 salt)
  b) lauric acid lactam
  c) 11-aminoundecanoic acid
  d) an equimolar mixture of azelaic acid and hexamethylenediamine (6,9 salt)
  e) an equimolar mixture of sebacic acid and hexamethylenediamine (6,10 salt)
  f) an equimolar mixture of dodecane dicarboxylic acid and hexamethylenediamine (6,12 salt)

B) the melting point of the copolyamide is lower than 140° C. and

C) lauric acid lactam and/or 11-aminoundecanoic acid are copolymerized into the copolyamide in an amount of at least 10% by weight, the total amount of components a) to f) constituting 100% by weight.

Surprisingly, the inventive copolyamides can be bonded at temperatures clearly below their melting temperature and exhibit outstanding resistance to laundering and dry cleaning. They are prepared without using caprolactam and therefore overcome the disadvantages mentioned above, such as the release of caprolactam when bonding and "fogging".

Pursuant to a preferred development of the invention, the following monomer components are copolymerized in the amounts given in the copolyamide:

10–60% by weight of lauric acid lactam
10–50% by weight of 11-aminoundecanoic acid
15–50% by weight of 6,9 salt, the total amounts of the components constituting 100% by weight.

Pursuant to a further preferred development of the invention, the following monomer components are copolymerized in the amounts given in the copolyamide:

20–80% by weight of 11-aminoundecanoic acid and/or lauric acid lactam
10–30% by weight of 6,6 salt
10–50% by weight of 6,9 salt
0–40% by weight of 6,10 salt, the total amounts of the components constituting 100% by weight.

Pursuant to the invention, the copolyamides are synthesized by known methods. The synthesis is usually carried out at temperatures of about 280° to 300° C. and preferably at about 290° C. and at pressures of 11 to 51 bar and preferably of 16 to 31 bar. Under these conditions, the polymerization is carried out for several hours. To adjust the pressure, water is added in the usual manner. Subsequently, a post-condensation reaction is carried out preferably for some hours and particularly for 1 to 3 hours at a temperature of 250° to 300° C. In particular, the condensation is advisably carried out with exclusion of air, that is, in an inert gas atmosphere. The usual catalysts, chain terminators and/or other additives, as well as process conditions, known for the synthesis of copolyamides, can be used.

Small amounts of other polyamide-forming materials, with the exception of caprolactam, can also be copolymerized into the copolyamides.

It is also possible to use 12-aminolauric acid instead of lauric acid lactam or in admixture with it.

The copolyamides are used as is customary in the art.

The individual components and their quantitative ratios are selected pursuant to the invention, so that the melting point of the copolyamide is lower than 140° C.

If the copolyamide does not contain at least 10% by weight of lauric acid lactam and/or 11-aminoundecanoic acid, the desired melting point of less than 140° C. cannot be attained.

Substrates of various types, particularly advantageously temperature-sensitive substrates, can be bonded with substrates of the same or of a different type with the help of the copolyamides. The copolyamides can be bonded already at temperatures, which lie far below their melting points, since they develop outstanding adhesiveness already at these temperatures. This is exceedingly surprising.

Examples of substrates to be bonded are textile materials of natural or synthetic fibers, such as wool, silk, cotton, polyester and polyamides. Other temperature-sensitive substrates, such as leather, plastic sheets and the like can also be heat sealed pursuant to the invention, using the copolyamides.

The invention is explained by the following Examples.

EXAMPLE 1

Into an 30 L autoclave, equipped with stirrer, gas inlet and outlet, 2 kg of 11-aminoundecanoic acid
4 kg of lauric acid lactam
4 kg of 6,9 salt and 800 mL of water are weighed. The oxygen of the air is removed by flushing with nitrogen. The reaction mass is heated to 290° C. and the increasing internal pressure of the autoclave is limited to 26 to 31 bar by an appropriate setting of the valve. The reaction mass is stirred for 3 hours under these conditions. After that, the pressure is reduced to atmospheric pressure over a period of 2 hours. The reaction mass is then reacted out for 2 hours at atmospheric pressure under a slow current of nitrogen. At the end of the pressureless postcondensation phase, the melt is spun by means of a gear pump through an orifice to form a monofilament, cooled and granulated. The resulting granulate has a melting range of 107° to 114° C.

EXAMPLE 2

Under the polycondensation conditions given in Example 1, the following polyamide-forming monomers 2 kg of 6,6 salt
3 kg of 6,9 salt
5 kg of lauric acid lactam to which 800 mL of water have been added, are reacted. The resulting copolyamide has a melting range of 118° to 125° C.

EXAMPLE 3

As in Example 1, a copolyamide is synthesized from the following components:

3 kg of lauric acid lactam
2 kg of 11-aminoundecanoic acid
3 kg of 6,9 salt
2 kg of 6,6 salt with the addition of 800 mL of water. A copolyamide, with a melting range of 126° to 132° C. is obtained.

EXAMPLE 4

As in Example 1, a copolyamide is synthesized from the following components:

3 kg of 11-aminoundecanoic acid
4 kg of lauric acid lactam
3 kg of 6,6 salt with the addition of 800 mL of water. A copolyamide, with a melting range of 125° to 135° C. is obtained.

Comparison Example 1

As in Example 1, a copolyamide is synthesized from the following monomeric components:

4.5 kg of lauric acid lactam
1 kg of 11-aminoundecanoic acid
3 kg of caprolactam
1.5 kg of 6,6 salt with the addition of 800 mL of water. The polyamide obtained has a melting range of 105° to 115° C.

Comparison Example 2

As in Example 1, a copolyamide is synthesized from the following monomeric components:

4 kg of lauric acid lactam
4 kg of caprolactam
2 kg of 6,6 salt with the addition of 800 mL of water. The copolyamide has a melting range of 115° to 125° C.

Comparison Example 3

Corresponding to the state of the art, a copolyamide is synthesized from the following monomeric components:
  6 kg of lauric acid lactam
  2 kg of caprolactam
  2 kg of 6,6 salt
with the addition of 800 mL of water. This copolyamide has a melting range of 125° to 135° C.

The adhesive properties of the inventive copolyamides are compared in the following Tables 1 to 3 with the adhesive properties of the caprolactam-containing comparison copolyamides. In each case, copolyamides with the same melting range are compared.

The inventive polyamides of Examples 1 to 4 and the comparison polyamides of comparison experiments 1 to 3 were in each case milled with cooling and divided into a fraction from 0 to 200 μm by screening. The powder was imprinted at the rate of approximately 15 g/m² as a 17 mesh grid on a conventional, commercial cotton interlining (with mass per unit area of 70 g/m²) by means of a powder point machine customarily used in the coating industry.

The coated interlinings were ironed, using an electrically heated steam press, onto a shell of 45% virgin wool and 55% polyester with a mass per unit area of 200 g/m², varying the plate temperature. The pressure of the press was 350 mbar. The platen temperatures of the steam press are given in Tables 1 to 3.

Furthermore, the melting ranges and viscosities of the respective copolyamides are given in the Tables. The melting ranges were determined by the method of DIN 53736, part B (visual determination of the melting temperature of partially crystalline plastics) using a microscope with a heated stage.

The solution viscosities were determined by the method of DIN 53727 (determination of the viscosity of solutions; polyamides in dilute solution).

Strips, 5 cm wide, were cut out from the laminates and tested on a tear machine for their peeling strength (N/5cm) in the untreated state, after three launderings at 40° C. or after three dry cleanings according to DIN 54310.

The values given are the averages of 5 individual measurements.

The abbreviations used in the Tables have the following meanings:

MFI: melt flow index, measured at 150° C. and 2,16 Kp load (DIN 53735)
6: caprolactam
6.9: 6,6 salt
6.9: 6,9 salt
12: lauric acid lactam
11: 11-aminoundecanoic acid

TABLE 1

| Product | Comparison Example I | Example I of the Invention |
|---|---|---|
| Composition (% by weight) | 6: 30 | 11: 20 |
|  | 6.6: 15 | 12: 40 |
|  | 12: 45 | 6.9: 40 |
|  | 11: 10 |  |
| Melting Range (°C.) | 105–115 | 107–114 |
| Solution Viscosity | 1.34 | 1.43 |
| MFI 150° C. (g/10 min) | 40 | 12 |

| Ironing Temperature | Peeling Strength Untreated | Peeling Strength Untreated |
|---|---|---|
| 80° C. | no adhesion | 5.0 |
| 90° C. | 1.5 | 7.5 |
| 100° C. | 5.0 | 10.0 |
| 110° C. | 7.5 | 12.5 |
| 120° C. | 8.0 | 13.0 |
| 130° C. | 8.0 | 15.0 |
| 140° C. | 9.0 | 15.5 |
| 150° C. | 8.5 | 16.5 |

| Ironing Temperature | Peeling Strength after Laundering | Peeling Strength after Laundering |
|---|---|---|
| 80° C. | no adhesion | 3.5 |
| 90° C. | no adhesion | 6.0 |
| 100° C. | 2.0 | 8.5 |
| 110° C. | 4.0 | 10.0 |
| 120° C. | 4.0 | 11.0 |
| 130° C. | 4.5 | 12.5 |
| 140° C. | 7.0 | 12.5 |
| 150° C. | 6.0 | 12.5 |

| Ironing Temperature | Peeling Strength after Dry Cleaning | Peeling Strength after Dry Cleaning |
|---|---|---|
| 80° C. | no adhesion | 3.0 |
| 90° C. | no adhesion | 6.0 |
| 100° C. | 4.0 | 7.0 |
| 110° C. | 4.0 | 8.0 |
| 120° C. | 4.0 | 11.5 |
| 130° C. | 4.5 | 11.0 |
| 140° C. | 7.0 | 11.5 |
| 150° C. | 6.0 | 12.0 |

TABLE 1

| Product | Comparison Example 2 | Example 2 of the Invention |
|---|---|---|
| Composition (% by weight) | 6: 40 | 6.6: 20 |
|  | 6.6: 20 | 6.9: 30 |
|  | 12: 40 | 12: 50 |
| Melting Range (°C.) | 115–125 | 118–125 |
| Solution Viscosity | 1.48 | 1.43 |
| MFI 150° C. (g/10 min) | 10 | 12 |

| Ironing Temperature | Peeling Strength Untreated | Peeling Strength Untreated |
|---|---|---|
| 80° C. | no adhesion | 3.0 |
| 90° C. | no adhesion | 4.0 |
| 100° C. | no adhesion | 6.0 |
| 110° C. | no adhesion | 11.0 |
| 120° C. | 5.0 | 13.5 |
| 130° C. | 7.0 | 14.5 |
| 140° C. | 8.0 | 14.5 |
| 150° C. | 9.0 | 15.0 |

| Ironing Temperature | Peeling Strength after Laundering | Peeling Strength after Laundering |
|---|---|---|
| 80° C. | no adhesion | 2.5 |
| 90° C. | no adhesion | 3.0 |
| 100° C. | no adhesion | 4.0 |
| 110° C. | no adhesion | 7.5 |
| 120° C. | 5.0 | 10.0 |
| 130° C. | 5.5 | 11.5 |
| 140° C. | 6.0 | 12.5 |
| 150° C. | 7.5 | 13.0 |

TABLE 1-continued

| Ironing Temperature | Peeling Strength after Dry Cleaning | Peeling Strength after Dry Cleaning |
|---|---|---|
| 80° C. | no adhesion | 2.5 |
| 90° C. | no adhesion | 3.0 |
| 100° C. | no adhesion | 4.0 |
| 110° C. | no adhesion | 8.0 |
| 120° C. | 5.0 | 9.5 |
| 130° C. | 5.5 | 11.0 |
| 140° C. | 6.0 | 11.0 |
| 150° C. | 7.0 | 13.0 |

TABLE 3

| Product | Comparison Example 3 | Example 3a of the invention | Example 3b of the invention |
|---|---|---|---|
| Composition | 6: 20 | 6.6: 20 | 6.6: 30 |
| (% by | 6.6: 20 | 6.9: 30 | 12: 40 |
| weight) | 12: 60 | 11: 20 | 11: 30 |
|  |  | 12: 30 |  |
| Melting Range (°C.) | 125–135 | 126–132 | 125–135 |
| Solution Viscosity | 1.47 | 1.45 | 1.45 |
| MFI 150° C. (g/10 min) | 15 | 12 | 13 |

| Ironing Temperature | Peeling Strength Untreated | Peeling Strength Untreated | Peeling Strength Untreated |
|---|---|---|---|
| 80° C. | no adhesion | 5.0 | 4.0 |
| 90° C. | no adhesion | 6.0 | 5.5 |
| 100° C. | no adhesion | 7.5 | 8.0 |
| 110° C. | no adhesion | 8.0 | 10.0 |
| 120° C. | 2.0 | 10.5 | 11.0 |
| 130° C. | 9.0 | 12.0 | 12.0 |
| 140° C. | 11.0 | 15.0 | 12.5 |
| 150° C. | 13.5 | 16.0 | 13.5 |

| Ironing Temperature | Peeling Strength after Laundering | Peeling Strength after Laundering | Peeling Strength after Laundering |
|---|---|---|---|
| 80° C. | no adhesion | 2.5 | 3.0 |
| 90° C. | no adhesion | 4.0 | 4.0 |
| 100° C. | no adhesion | 5.5 | 7.0 |
| 110° C. | no adhesion | 5.5 | 9.5 |
| 120° C. | 1.5 | 9.5 | 11.0 |
| 130° C. | 6.5 | 12.0 | 11.5 |
| 140° C. | 9.5 | 13.0 | 12.5 |
| 150° C. | 12.5 | 14.0 | 13.5 |

| Ironing Temperature | Peeling Strength after Dry Cleaning | Peeling Strength after Dry Cleaning | Peeling Strength after Dry Cleaning |
|---|---|---|---|
| 80° C. | no adhesion | 3.0 | 3.5 |
| 90° C. | no adhesion | 5.5 | 4.5 |
| 100° C. | no adhesion | 6.5 | 6.5 |
| 110° C. | no adhesion | 6.5 | 9.0 |
| 120° C. | 2.0 | 8.5 | 11.0 |
| 130° C. | 7.5 | 10.5 | 11.5 |
| 140° C. | 10.0 | 11.5 | 12.5 |
| 150° C. | 12.0 | 13.0 | 14.0 |

It is evident from Table 1 that the inventive copolyamide of Example 1 has a melting range comparable to that of the comparison copolyamide, but a higher solution viscosity and a lower melt flow index. As a result, the danger that the melt adhesive will strike-back is greatly reduced. Despite the lower melt flow index, the product from Example 1 is distinguished by adhesion values at low temperatures, which are distinctly higher than those achieved with the polyamide of Example 1. By comparing the cohesiveness, it can be seen that the copolyamide of Comparison Example 1 can be bonded with good adhesion even at temperatures far below its melting point and, after being bonded at high temperatures, has a significantly higher cohesiveness than the comparison copolyamide. The cohesiveness after laundering or dry cleaning is also in each case practically twice as high as that of the comparison copolyamide.

A similar trend for copolyamides with a melting range of 115° to 125° C. can be inferred from Table 2. For example, the copolyamide of the Example bonds at a temperature more than 30° C. below the melting range; with the comparison copolyamide, a similar high adhesion can be attained only when bonded at a temperature in the melting range.

After laundering as well as after dry cleaning, the cohesiveness of the copolyamide of Example 2 is almost twice as high as that obtained with the corresponding polyamide of Comparison Example 2.

According to Table 3, similar results arise also for copolyamides with a melting range of 125° to 135° C. The copolyamide of Example 3, ironed on at 80° C., already has twice as high a cohesiveness as the copolyamide of Comparison Example 3, ironed on at 120° C.

The copolyamides, used pursuant to the invention, can accordingly not only be ironed on at very low temperatures, which makes them appear to be particularly suitable for bonding sensitive substrates, but also exhibit clearly improved adhesiveness compared to the copolyamide of the state of the art.

We claim:

1. A copolyamide composition as a melt adhesive for heat sealing characterized by being free of caprolactam and in that A) at least three of the following monomer components are copolymerized within the copolyamide:
  a) an equimolar mixture of adipic acid and hexamethylenediamine (6,6 salt)
  b) lauric acid lactam
  c) 11-aminoundecanoic acid
  d) an equimolar mixture of azelaic acid and hexamethylenediamine (6,9 salt)
  e) an equimolar mixture of sebacic acid and hexamethylenediamine (6,10 salt
  f) an equimolar mixture of dodecane dicarboxylic acid and hexamethylenediamine (6,12 salt)

B) the melting point of the copolyamide is lower than 140° C. and

C) lauric acid lactam and/or 11-aminoundecanoic acid are copolymerized into the copolyamide in an amount of at least 10% by weight, the total amount of components a) to f) constituting 100% by weight.

2. The copolyamide composition of claim 1 wherein, in the event that the monomer components are lauric acid lactam, 6,6 salt, 6,10 salt and/or 6,12 salt, at least one additional monomer component must be copolymerized within the copolyamide.

3. The copolyamide composition of claim 1, wherein the monomer components are copolymerized in the following amounts in the copolyamide:

10–60% by weight of lauric acid lactam
10–50% by weight of 11-aminoundecanoic acid
15–50% by weight of 6,9 salt,
the total amount of the components constituting 100% by weight.

4. The copolyamde composition of claim 1, wherein the monomer components are copolymerized in the following amounts in the copolyamide:

20–80% by weight of 11-aminoundecanoic acid and/or lauric acid lactam

10–30% by weight of 6,6 salt

10–50% by weight of 6,9 salt

0–40% by weight of 6,10 salt, the total amounts of the components constituting 100% by weight.

5. The copolyamde composition of claim 1, wherein the monomer components are copolymerized in the following amounts in the copolyamide:

40–60% by weight of lauric acid lactam

10–30% by weight of 6,6 salt

20–40% by weight of 6,9 salt, the total amounts of the components constituting 100% by weight.

6. The copolyamde composition of claim 1, wherein the monomer components are copolymerized in the following amounts in the copolyamide:

10–30% by weight of 11-aminoundecanoic acid

30–50% by weight of lauric acid lactam

30–50% by weight of 6,9 salt, the total amounts of the components constituting 100% by weight.

7. The copolyamde composition of claim 1, wherein the monomer components are copolymerized in the following amounts in the copolyamide:

20–40% by weight of 11-aminoundecanoic acid

10–30% by weight of lauric acid lactam

20–40% by weight of 6,6 salt, the total amounts of the components constituting 100% by weight.

8. The copolyamde composition of claim 1, wherein the monomer components are copolymerized in the following amounts in the copolyamide:

20–40% by weight of lauric acid lactam

10–30% by weight of 11-aminoundecanoic acid

20–40% by weight of 6,9 salt

10–30% by weight of 6,6 salt, the total amounts of the components constituting 100% by weight.

* * * * *